United States Patent
Chandaria et al.

(10) Patent No.: US 9,830,136 B2
(45) Date of Patent: Nov. 28, 2017

(54) METHOD AND APPARATUS FOR FIRMWARE VIRTUALIZATION

(71) Applicant: Ciambella Ltd., Tortola (VG)

(72) Inventors: Trisala Chandaria, New York, NY (US); Jean-Baptiste Leonelli, New York, NY (US)

(73) Assignee: Ciambella Ltd., Tortola (VG)

( * ) Notice: Subject to any disclaimer, the term of this patent is extended or adjusted under 35 U.S.C. 154(b) by 54 days.

(21) Appl. No.: 14/328,415

(22) Filed: Jul. 10, 2014

(65) Prior Publication Data

US 2015/0019692 A1    Jan. 15, 2015

Related U.S. Application Data

(60) Provisional application No. 61/845,395, filed on Jul. 12, 2013.

(51) Int. Cl.
  *G06F 9/455* (2006.01)
  *G06F 9/445* (2006.01)
  *G06F 9/44* (2006.01)
  *H04L 29/08* (2006.01)

(52) U.S. Cl.
  CPC .............. *G06F 8/60* (2013.01); *G06F 9/4416* (2013.01); *G06F 9/455* (2013.01); *G06F 9/45558* (2013.01); *H04L 67/34* (2013.01); *G06F 8/665* (2013.01)

(58) Field of Classification Search
  None
  See application file for complete search history.

(56) References Cited

U.S. PATENT DOCUMENTS

| | | | |
|---|---|---|---|
| 5,623,604 A | 4/1997 | Russell et al. | |
| 6,266,809 B1 * | 7/2001 | Craig | G06F 9/4416 717/173 |
| 8,352,903 B1 | 1/2013 | Friedman | |
| 9,148,413 B1 * | 9/2015 | Marr | G06F 21/572 |
| 2002/0194313 A1 | 12/2002 | Brannock | |
| 2003/0177208 A1 | 9/2003 | Harvey, IV | |
| 2004/0267926 A1 | 12/2004 | Rothman et al. | |
| 2006/0122730 A1 | 6/2006 | Niemela et al. | |
| 2006/0277328 A1 * | 12/2006 | Cherian | G06F 3/0607 710/36 |

(Continued)

OTHER PUBLICATIONS

International Search Report and written Opinion dated Apr. 13, 2017 for PCT Application No. PCT/US2016/067944, 14 pgs.

(Continued)

*Primary Examiner* — Nicholas Taylor
*Assistant Examiner* — Christopher B Robinson
(74) *Attorney, Agent, or Firm* — Moser Taboada (57) ABSTRACT

A system and method operative to virtualize firmware of a user device that stores virtualized firmware for a user device on a remote server and receives firmware data from the user device via a network. The method parsing the firmware data, assigning the parsed firmware data to a corresponding virtualized firmware stored on the remote server, and inserting the parsed firmware data into the corresponding virtualized firmware. The method deploying at least one remote process to access remote services offered by the remote server based on the corresponding virtualized firmware with the parsed firmware data.

20 Claims, 6 Drawing Sheets

(56) References Cited

U.S. PATENT DOCUMENTS

| | | | |
|---|---|---|---|
| 2007/0056024 A1* | 3/2007 | Hsu | H04L 63/083 726/5 |
| 2007/0186246 A1 | 8/2007 | Goldhor | |
| 2007/0234341 A1* | 10/2007 | Chang | G06F 8/65 717/173 |
| 2008/0082603 A1* | 4/2008 | Mansour | G06F 9/4445 709/203 |
| 2009/0095807 A1 | 4/2009 | Dickerson et al. | |
| 2009/0198770 A1 | 8/2009 | Jiang | |
| 2010/0010908 A1 | 1/2010 | Pasupulati et al. | |
| 2010/0299187 A1* | 11/2010 | Duggal | G06Q 10/10 705/14.1 |
| 2011/0238969 A1 | 9/2011 | Warkentin et al. | |
| 2011/0271269 A1 | 11/2011 | Tazzari et al. | |
| 2011/0295391 A1 | 12/2011 | Schneider et al. | |
| 2012/0036493 A1 | 2/2012 | Moosmann et al. | |
| 2012/0198434 A1* | 8/2012 | Dirstine | G06F 8/65 717/170 |
| 2012/0233588 A1 | 9/2012 | Mruthyunjaya et al. | |
| 2013/0125107 A1* | 5/2013 | Bandakka | G06F 8/665 717/171 |
| 2013/0275560 A1 | 10/2013 | Bestmann et al. | |
| 2014/0123124 A1* | 5/2014 | Gray | G06F 8/665 717/170 |
| 2014/0372963 A1 | 12/2014 | Chandaria et al. | |
| 2015/0045960 A1 | 2/2015 | Caron et al. | |

OTHER PUBLICATIONS

International Search Report and written Opinion dated Oct. 4, 2016 for PCT Application No. PCT/US2016/041573.

Feipeng Liu, "Android Native development Kit Cookbook", Mar. 1, 2013, XP055326992, ISBN: 978-1-84969-150-5, retrieved on Dec. 7, 2016 from: http://file.allitebooks.com/20150520/Android%20Native%20Development%20Kit%20Cookbook.pdf, pp. 1-331.

* cited by examiner

METHOD AND APPARATUS FOR FIRMWARE VIRTUALIZATION

CROSS-REFERENCE TO RELATED APPLICATION

This application claims priority to U.S. Provisional Patent Application No. 61/845,395 filed on Jul. 12, 2013, which is incorporated by reference herein in its entirety.

BACKGROUND OF THE INVENTION

Field of the Invention

Embodiments of the present invention generally relate to a method and apparatus for firmware virtualization.

Description of the Related Art

In electronic systems and computing, firmware is the combination of persistent memory, with program code and data stored in the memory. Typical examples of devices containing firmware are embedded firmware systems (such as traffic lights, consumer appliances, and digital watches, computers, computer peripherals, digital cameras and the like). The firmware contained in these devices provides the control program for the device. Firmware is typically held in non-volatile memory devices such as ROM, EEPROM, or flash memory often embedded in the device. Changing the firmware of a device may rarely or never be done during its economic lifetime. Some firmware memory devices are permanently installed and cannot be changed after manufacturing. Common reasons for updating firmware include fixing bugs or adding features to the device after the device is made available to users. This may require physically changing ROM integrated circuits or reprogramming flash memory with a special procedure that requires erasing and replacing all instructions stored in the firmware. Firmware such as the ROM BIOS of a personal computer may contain only elementary basic functions of a device and may only provide services to higher-level software. Firmware such as the program of the embedded system memory may be the only program that will run on the system and provide all of its functions.

The proliferation of network connectivity and CLOUD based deployment has however changed the way applications/software are virtualized. Network connected devices are capable of flashing or installing firmware updates via the Internet. However, updates need to be limited to the size of the embedded memory and often require manual user initiation, restarting the device, flashing the firmware ROM, time to download, and otherwise inconvenient steps that interrupt operation of the electronic device.

Thus, there is a need in the art for firmware virtualization for faster deployment of new firmware and expanding firmware capability.

SUMMARY OF THE INVENTION

Embodiments of the present invention generally relate to a method, apparatus for firmware virtualization of a user device using calls to remotely stored firmware to execute remote processes and returning the results of the process to the user device firmware that is substantially shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the described following embodiments, a "process" shall refer to a ready-to-run code base or pre-generated process code for a function that is stored on an execution computer (e.g., server, personal computer, mobile device, etc.). Each process is uniquely identified by name, process ID, icon, or other identifier indicating functionality of the process to the user of an integrated development environment (IDE). The process includes the firmware data communicated between the embedded firmware of user devices. Execution shall refer to the launch of a process on a computer (local or remote, or CLOUD based). Deployment is sending or storing final code that is conditioned to be executed at a later time. A "bundle" shall refer to a collection of processes organized by a common attribute (API name, common parameters, SDK, parameter names, remote service, and the like). Functions (e.g., processes) are descriptive terms and/or images for presentation to the user that describe the operation of code associated with the process. In some embodiments, functions may include process code.

"Firmware" shall refer to code stored in non-volatile memory embedded in a user device including code for basic functions to provide services to higher-level software. As will be discussed below, the user device is an electronic device capable of connecting to a remote server to access a virtualized firmware. Non-limiting examples of a user device include laptops, tablets, cell phones, computers, appliances, gaming systems, printers, scanners, peripherals, motor vehicles, processors, microcontrollers, and other electronic devices with stored firmware.

Embodiments disclosed herein relate to a firmware library on a remote server or group of servers (i.e. "in the CLOUD") wherein the user device can remotely select or automatically connect to the remote server to access the process from firmware on the user device. In some embodiments, a remote process call is downloaded and installed into the firmware of the user device for directly calling the process on the remote server from the user device. A computing platform includes a hardware architecture and a software framework (including application frameworks), where the combination allows software to run. Typical platforms include a computer architecture, operating system, and runtime libraries.

Figure 1:
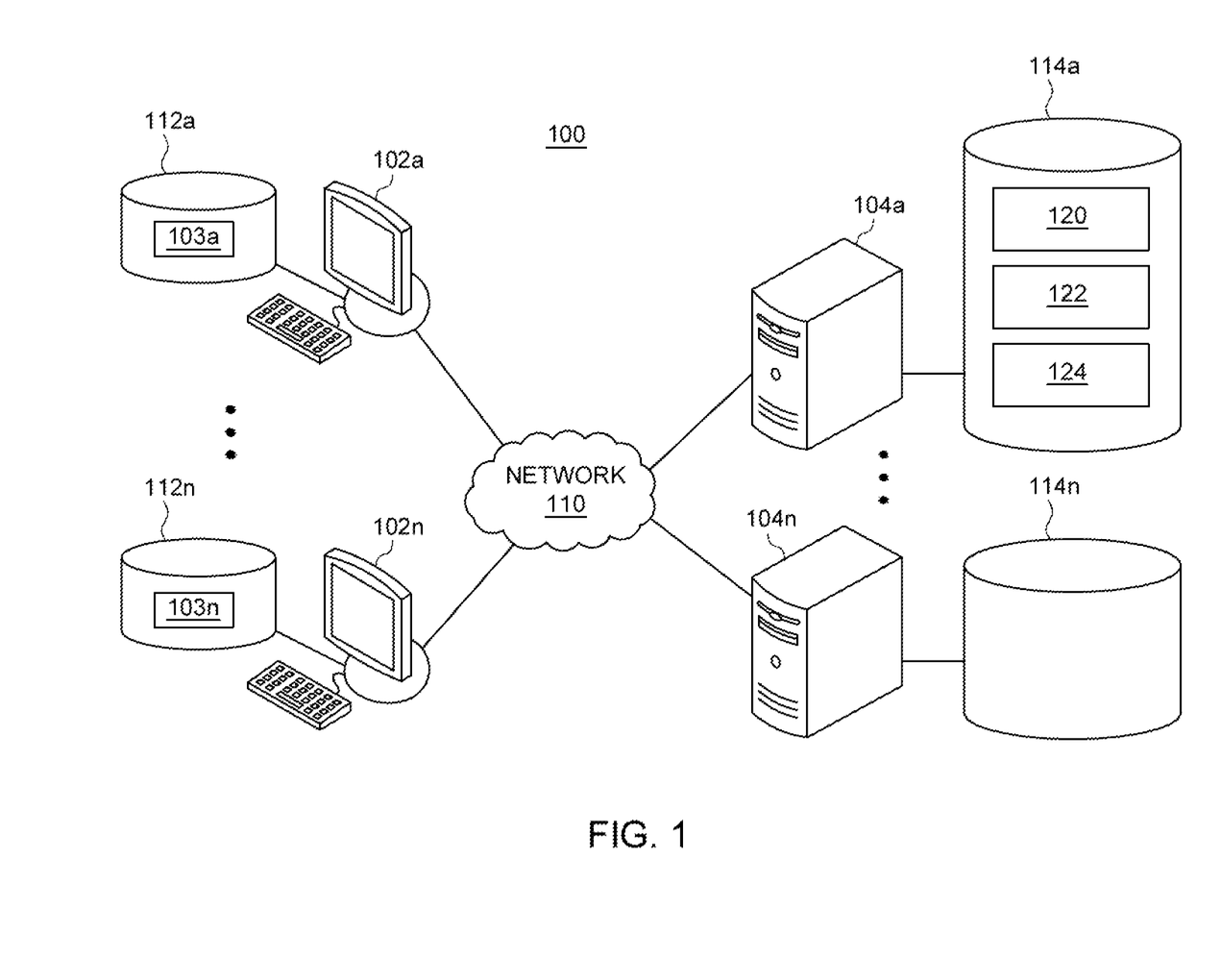
FIG. 1 is an illustration of a firmware virtualization system in accordance with one or more embodiments of the present invention.

FIG. 1 is an illustration of a firmware virtualization system 100 in accordance with one or more embodiments of the present invention. The system 100 comprises at least one user device (102a . . . 102n), a network 110, and at least one remote server (104a . . . 104n). The at least one user device (102a . . . 102n) is collectively referred to as user devices 102 comprise an electronic device capable of storing and executing a program such as a personal computer, peripherals, appliances, gaming systems, server, virtual server, microcontroller (MCU) and controller, sensor, actuator, edge device connected to a gateway, application-specific integrated circuit (ASIC), micro-processor and processor, cellular phone, smart phone, tablet, laptop, and the like.

Each user device (102a . . . 102n) comprises a corresponding memory (112a . . . 112n) storing embedded firmware (103a . . . 103n) and code necessary to connect to and authenticate into the network 110 to connect to at least one remote server (104a . . . 104n). The firmware utilizes a connection agent to facilitate connection to the network 110 and remote servers 104.

The network 110 may comprise at least one of or combination of a wired and/or wireless network such as: a local area network (LAN), wide area network (WAN), wireless local area network WLAN, cellular network, Wi-Fi, Internet, or Intranet networks. The at least one remote server (104a . . . 104n) may comprise a remote application server, web server, mail server, host server, database server, storage server, and the like.

The at least one remote server (104a . . . 104n) comprises a remote firmware virtualization platform (hereinafter "platform") 108 and memory (114a . . . 114n) to store and execute particular process calls for virtualized firmware using a firmware collection 120, device profiles 122, and execution engine 124. Device profiles 122 may include additional information regarding the user device 102a (e.g., firmware update histories, known errors, extensions, libraries, and the like).

The memory 114a . . . 114n may also store a user interface module, database of user profiles/accounts, collection of processes (i.e., process libraries), SDKs, and associated parameters to link and execute the processes across other servers (104n) on the network 110.

As will be discussed further below, the execution engine 124 deploys a remote process based on the virtualized firmware and firmware data received from the user devices 102. In embodiments with remote process calls stored in the firmware of the user devices 102, the execution engine 124 processes calls to routines in process libraries by correlating an identified routine called and running/executing the process using the firmware parameters and call parameters. Call parameters are stored either on a user device 102a or remote server 104a, and in some embodiments specified directly by the user via interaction with the firmware of the user device 102a such as via a graphical user interface or button press. Process call parameters are parsed from firmware data communications from the user device 102a. In some embodiments, the execution engine 126 may send output to another process call or the original process call stored on the remote server 104 prior to returning the results of the process to the firmware of user device 102a.

Figure 2:
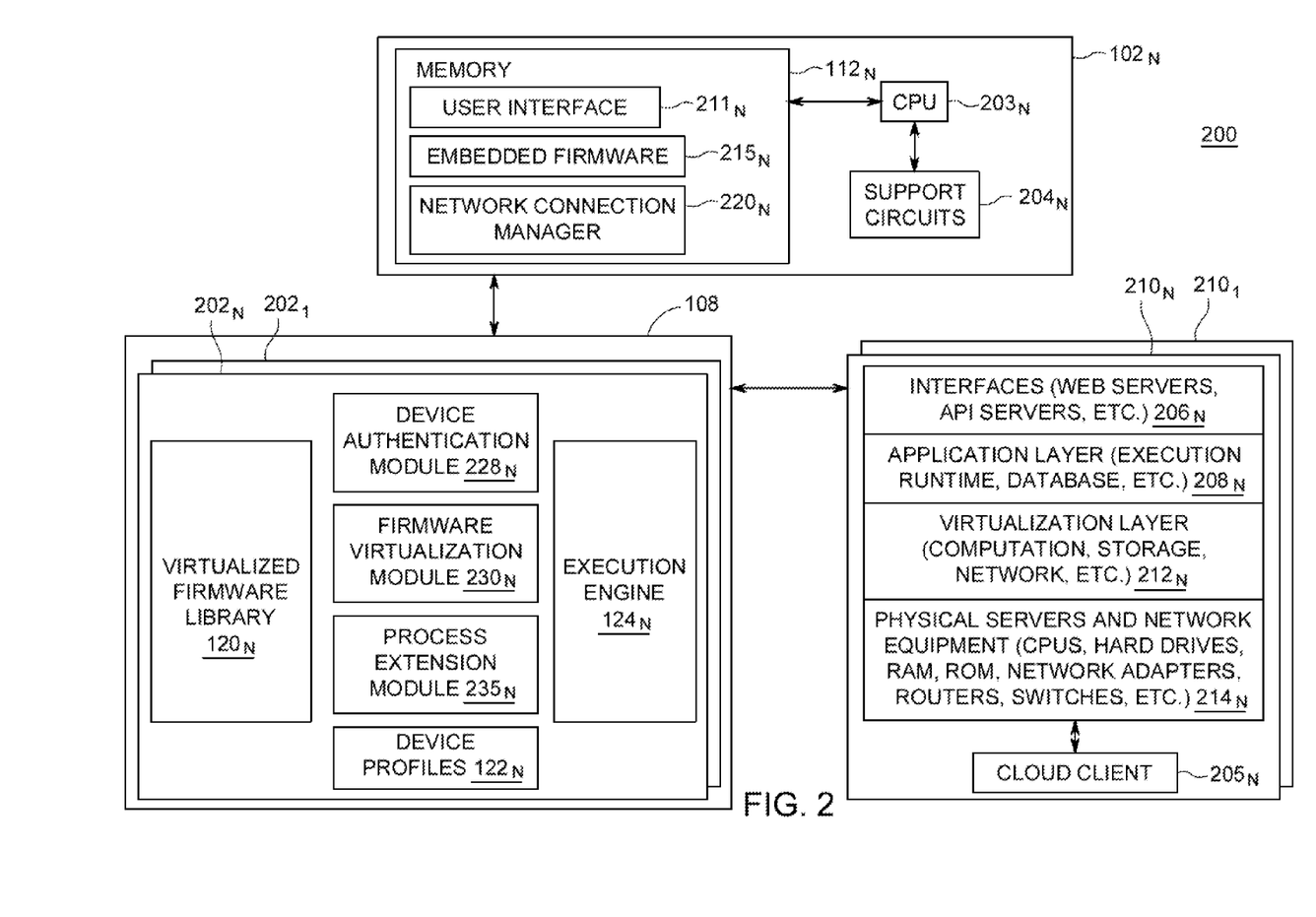
FIG. 2 is an illustration of a firmware virtualization system in accordance with one or more embodiments of the present invention.

FIG. 2 is an illustration of a firmware virtualization system 200 in accordance with one or more embodiments of the present invention. The system 200 comprises a user device 102n, a firmware virtualized firmware platform 108, and virtualized firmware services ($202_1$ . . . $202_N$). The user device 102n includes at least a CPU $203_N$, support circuits $204_N$, and memory 112n containing instructions and algorithms. The CPU $203_N$ processes inputs and outputs to the user device 102n. The CPU $203_N$ may be any commercially available processor, microprocessor, microcontroller, and the like. In other embodiments, the CPU $203_N$ is a microcontroller such as a PIC. The support circuits $204_N$ comprise well known circuits that provide functionality to the CPU $203_N$ such as clock circuits, network communications, cache, power supplies, I/O circuits, and the like. Alternative embodiments may use control algorithms on a custom Application Specific Integrated Circuit (ASIC).

The memory 112n may be any form of digital storage used for storing data and executable software. Such memory includes, but is not limited to, random access memory, read only memory, disk storage, optical storage, and the like. The memory 112n stores computer readable instructions corresponding to: a user interface $211_N$, embedded firmware $215_N$, and a network connection manager $220_N$.

In some embodiments, the user interface $211_N$ comprises a keypad, electronic buttons, speaker, touchscreen, display, or other user interaction mechanism. In some embodiments, the user interface $211_N$ may communicate with the embedded firmware $215_N$ such that the user may interact with the user device 102n.

The embedded firmware $215_N$ includes instructions for operation of the user device 102n. In some embodiments, the embedded firmware $215_N$ may be a basic instruction set utilized to execute programs written in a higher level language. In other embodiments, the embedded firmware $215_N$ may be an executable program. The embedded firmware $215_N$ communicates with the network connection manager $220_N$ such that the embedded firmware may be coupled to external virtualized firmware services ($202_1$ . . . $202_N$). The embedded firmware $215_N$ further includes code that allows substantially all basic input signals and output signals of the user device 102n to be available for communication by the network connection manager $220_N$. In an example where the user device 102n is a printer, the embedded firmware $215_N$ selectively allows firmware data for buttons, indicators (e.g., LEDs), display screens, or cached print file data to be transmitted to the network connection manager 220.

The network connection manager $220_N$, prepares firmware data for communication from the user device 102n, as well as receiving firmware data from the virtualized firmware platform 108. The network connection manager $220_N$ may be coupled via wired or wireless networking and operates as a bridge to access the network 110 and the platform 108.

The virtualized firmware platform 108 encodes signals to, and decodes signals from, the network connection manager $220_N$. The virtualized firmware platform 108 comprises at least one virtual firmware provider (VFP) $202_N$ that are collectively referred to as VFPs 202. VFPs 202 include a virtualized firmware library $120_N$, execution engine $124_N$, device authentication module $228_N$, firmware virtualization module $230_N$, process extension module $235_N$, and a database of device profiles $122_N$. In some embodiments, the virtualized firmware platform 108 includes code to execute processes with other VFPs 202 as well as code to call and interface with remote services offered by classical service components (CSCs) $210_1 \ldots 210_N$.

The device authentication module $228_N$ determines the embedded firmware of the user device 102n by comparing the firmware to virtualized firmware stored in the virtualized firmware library $120_N$ and/or device profiles $122_N$. In some embodiments, device profiles $122_N$ also include user account information and preferences for customization of virtualized firmware and execution of the virtualized firmware based on user preferences. For example, user account preferences may specify that when a printer matching the firmware and ownership of the user connects to the virtualized firmware platform 108, a PDF document is generated and emailed to a specified user email account of every document printed. Account information such as the email address of the email account may be stored as part of the user account.

In some embodiments, the device authentication module $228_N$ verifies tokens and credentials associated with virtualized firmware services ($202_1 \ldots 202_N$) for a specific user account corresponding to a specific CSC 210. For example, the device authentication module $228_N$ may also retrieve stored email credentials to login to a CSC 210 that is a POP3 email server to execute a sending email process based on a process from the process extension module $235_N$.

The firmware virtualization module $230_N$ processes firmware data from the user device 102n as well as generate virtualized firmware. To generate virtualized firmware, the firmware virtualization module $230_N$ receives firmware (e.g., from a software developer or manufacturer of the user device 102n). The firmware instructions and parameters (e.g., variables) are parsed. Sources of the values for the parameters are determined based on whether the values originate from the user device 102n, a process from the VFPs 202, or a service offered by the CSCs 210. The parameters are also examined to determine relative association with other parameters in the firmware. The parameters are then assigned and linked to the respective data sources. The linked and associated format of the firmware is stored as a virtualized firmware instruction set in the virtualized firmware library $120_N$.

In some embodiments, the virtualized firmware library $120_N$ includes updated firmware instructions for the user device 102n. By including the latest firmware version, developers may quickly distribute and determine the firmware version being deployed on user device(s) 102 without having to install new firmware on the user device 102n. In other words, a user device 102n may operate on the virtualized firmware over the network 110 that extends the capabilities of the embedded firmware $215_N$. As will be discussed in further detail below, during instances the network 110 is unavailable, the user device 102 operates with the factory installed firmware until such time the network 110 and virtualized firmware is again available.

The process extension module $235_N$ coordinates with the firmware virtualization module $230_N$ to execute processes between the virtualized firmware and services offered by platform 108 as deployed on CSCs 210. The process extension module $235_N$ coordinates the linking of virtualized firmware parameters and parameter value sources to execute a process specified by the user or by a developer in the device profiles $122_N$. The process extension module $235_N$ also generates code to link the virtualized firmware with corresponding APIs and SDKs to implement a specific process as necessary for CSCs 210. For example, a printer (i.e., user device 102n) may have "cancel print" button that is programmed by the manufacturer to cancel and delete printer cache of a current document. As specified by a process on the platform 108, and using a virtualized firmware, the same button pressed twice can trigger the printer to send the printer cache data to the VFPs 202 to subsequently extract the cache data and generate a digital PDF image of the file. The PDF image is then emailed to an email address stored in the device profiles $122_N$. Thus, extending the firmware capability of the printer without modifying or requiring additional processing by the embedded firmware $215_N$.

CSCs 210 are virtualized by the cloud client $205_N$ and interfaced with the platform 108, such that processes are deployed on the CSCs 210. In some embodiments, the CSCs 210 are communicatively coupled to the platform 108 via network 110. The CSC $210_N$ comprises a remote interface $206_N$, an application layer $208_N$, virtualization layer $212_N$, and physical equipment $214_N$. Each CSC 210 represents a specific remote service offered by the platform 180. For example CSC $210_N$ may be an Internet service and corresponding servers (e.g., FACEBOOK, EBAY, POP3 e-mail, TWITTER, AMAZON, SMS, FTP, HTTP, and the like) and CSC $210_2$ may be a computer offering conventional local data information processing (e.g., image rendering, code compiling, data analytics, data storage, and the like).

Physical equipment $214_N$ or machines (CPUs, memory, network routers, and the like) are virtualized in a virtualization layer $212_N$ to make processing and storage resources available to the application layer $208_N$. Virtualization creates redundancy and increased operating bandwidth in a single computer, and even more in embodiments where multiple machines are virtualized. In such embodiments, the processing workload can also be allocated to various equipment based on priority and independent of the physical location.

An application layer $208_N$ allows execution runtime of programs and functionalities such as database operations (e.g., storing account profiles, warehousing data, and the like) on the virtualized machines. A remote interface layer $206_N$ comprises code to access web servers and utilize APIs. The remote interface $206_N$ communicates with the CLOUD client(s) $205_N$ (e.g., a thin client, web browser, mobile application, terminal emulator program, and the like).

The CLOUD client $205_N$ facilitates communication of data to and from the VCPs 245 with the application layer $208_1$. The CLOUD client 205 simplifies the layer interfaces $206_1$, $208_1$, $212_1$, and $215_1$ by presenting a web browser, terminal emulator or other client interface. Aforementioned embodiments of the present invention may utilize the CLOUD client 205 to facilitate remote process call code generation based on firmware data from the user device 102n using the virtualized firmware. The virtualized firmware links process calls generated and offered by VFPs 202 to the application layer $208_N$.

In some embodiments, the virtualized firmware platform 108 may comprise additional libraries of code to extend the capabilities of the embedded firmware 215. For example, if the user device 102n is a digital video recorder (DVR), the DVR embedded firmware includes a network connection manager $220_N$ for remote network storage of recorded television programs. In such an example, the embedded firmware $215_N$ comprises instructions only to communicate with the remote platform 108. VFPs 202 of the remote platform 108 subsequently processes the firmware data to receive the video and coordinates with additional and/or redundant storage on the network 110 using the virtualized firmware platform 108 to redirect the recording from the embedded firmware $215_N$. In another example, the VFPs 202 may include a virtualized firmware to independently tune to the channel so as to store the channel for recording upon triggering by a set-top box. In such an example, the set-top box embedded firmware $215_N$ sends a triggering parameter and the recording process is shifted to the VFPs 202 such that the set-top box firmware has the extended capability as a DVR.

Figure 3:
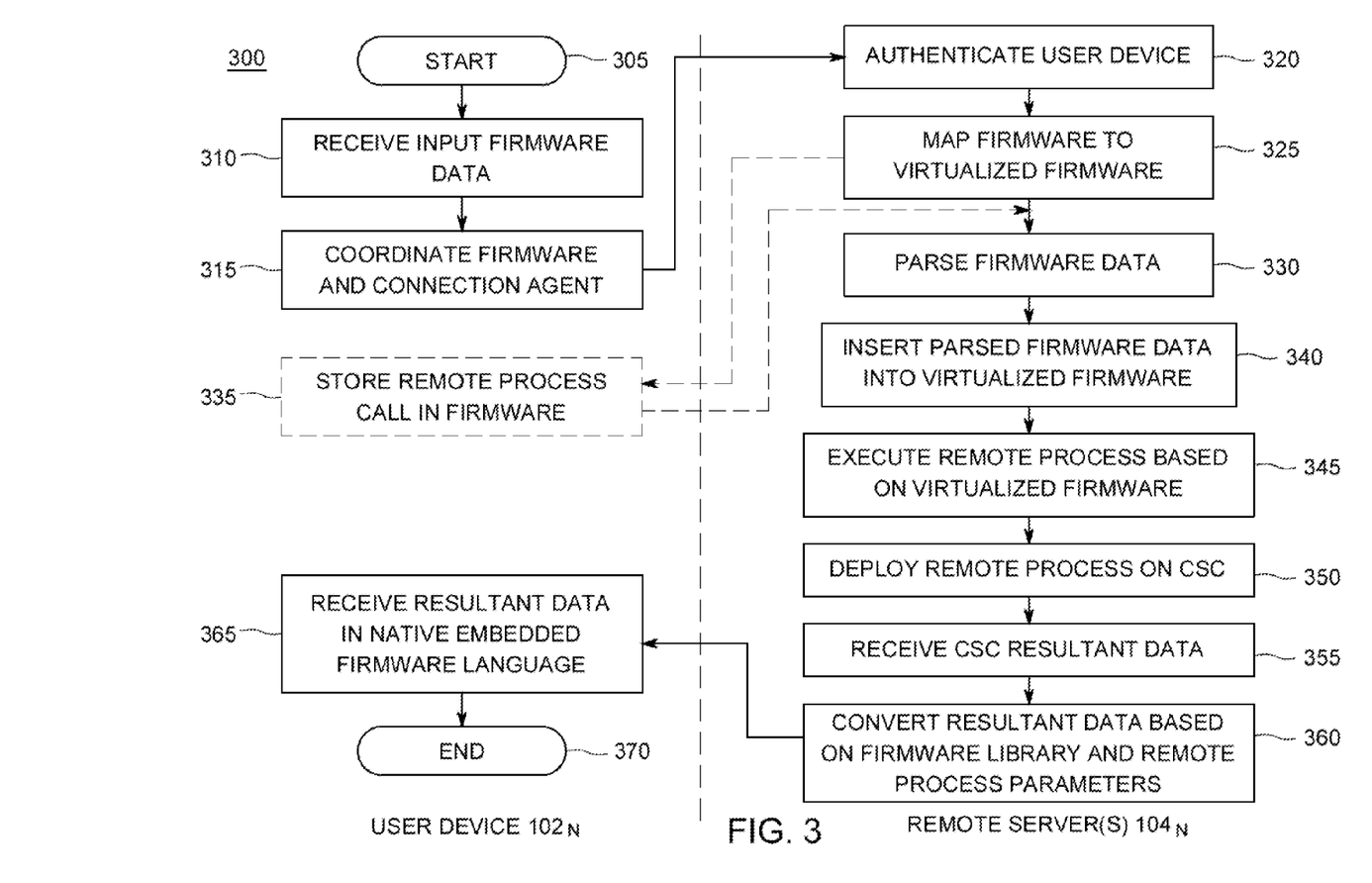
FIG. 3 is a flow diagram of an overview method using the virtualized firmware providers disclosed in FIG. 2 interfacing with embedded firmware of a user device in accordance with one or more embodiments of the present invention.

FIG. 3 is a flow diagram of an overview method 300 using the virtualized firmware providers 202 disclosed in FIG. 2 interfacing with embedded firmware $215_N$ of a user device $102_N$ in accordance with one or more embodiments of the present invention.

The method 300 begins at step 305 and continues to step 310. At step 310 the user device $102_N$ receives input firmware data. The firmware data includes data entered by a user as well as parameters for a process offered by the remote server $104_N$. The firmware data also includes device operational data, processor instructions, and analog signals converted to digital signals from external peripherals (e.g., sensor data, switches, push buttons, and the like).

Next, at step 315, the method 300 coordinates the embedded firmware $215_N$ and connection agent (e.g., network connection manager 220) to communicate the firmware data to the platform 108. The method then continues to step 320. At step 320, the user device $102_N$ is authenticated by the platform 108 on the remote server $104_N$. Authentication includes verifying a firmware operating on the user device $102_N$ as well as a predetermined user profile associated with the user device $102_N$.

At step 325, the method 300 matches the embedded firmware $215_N$ to a corresponding virtualized firmware stored in the virtualized firmware library $120_N$. The virtualization of a firmware for respective user devices 102 is further described in FIG. 4. In optional embodiments, the method 300 may continue to step 335 where a web link or remote process call is transmitted and stored in the embedded firmware $215_N$. In such an embodiment, the user device $102_N$ is stores instructions to trigger a remote process call of a process on the remote servers 104 directly, and without coordination step 315. The type of remote process to store is specified by the user or software developer of the virtualized firmware on the remote servers 104.

At step 330, the firmware data from the user device $102_N$ is parsed into respective parameters and contextually mapped to the virtualized firmware. Thus, parameters originating from a specific input or output on the user device is allocated to the corresponding virtualized firmware. For example, the embedded firmware parameter indicates a power light is ON in a television is accordingly associated to the equivalent parameter in the virtualized firmware.

Alternative embodiments include where the firmware data is pre-parsed and only such a portion (i.e., the parameters) are communicated to the remote server $104_N$. In such an embodiment, pre-parsed firmware data is assigned to equivalent virtualized firmware based on the mapping in step 325.

At step 340, the parsed firmware data is inserted into the virtualized firmware based on the matching and mapping in steps 325 and 330. Next, at step 345, a remote process is executed by the platform 108 based on the virtualized firmware and the firmware data received from the user device $102_N$.

At step 350, the process is deployed by the platform on a corresponding CSC 210. Continuing the example, a user may specify a process on the platform 108 to send an SMS text message to their cellphone when the television power light is ON to monitor television viewing in their home. In such an example, the firmware data is the power light of the television that is interpreted by the virtualized firmware and subsequently triggers a process that executes code to send a SMS message on a SMS server (i.e., CSC 210). The text message includes a notification of TV usage and sent to a specified cellphone number of a user cell phone as defined in the process or as stored on the remote servers 104 based on data associated with the user account.

At step 355, processed resultant data from the CSC 210 is returned to the platform 108. Resultant data includes a confirmation signal that a process has been successfully deployed. In addition, resultant data includes actively listening and receiving additional responses from the CSC 210. Continuing the example, the platform 108 listens for a SMS text message from the cell phone number of the user as well as content of the text message. The user may thus text a predetermined process command stored with the user profile on the remote server $104_N$ so as to control the television monitoring such as: power on, power off, reset viewing timer, and the like.

At step 360, the received data from the CSC is converted based on the virtualized firmware library and remote process parameters. The VFPs 202 also utilize corresponding APIs and SDKs to generate code or signals that are native to the embedded firmware $215_N$ of the user device 102.

At step 365, the resultant data is received by the connection agent and communicated to the embedded firmware $215_N$ to complete execution of the remote process. The received data is thus in a native language of the embedded firmware $215_N$ such that the user device $102_N$ is operated as if the remote process data originated and was generated by the embedded firmware $215_N$. The method 300 then ends at step 370.

Figure 4:
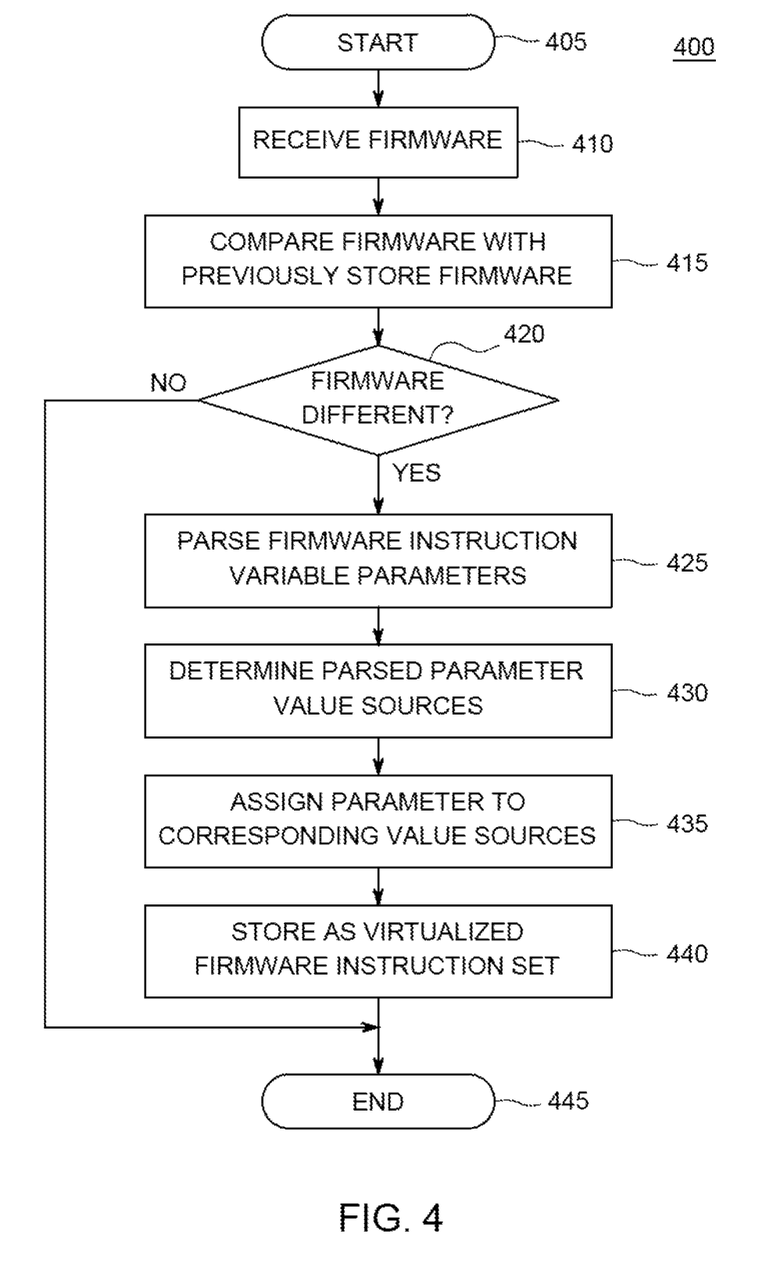
FIG. 4 is a flow diagram of a method for generating a virtualized firmware on the platform in accordance to one or more embodiments of the present invention.

FIG. 4 is a flow diagram of a method 400 for generating a virtualized firmware on the platform 108 in accordance to one or more embodiments of the present invention. Each firmware version for user devices is separately stored on the remote servers 104. In addition firmware versions may include multiple sub-iterations with modified parameters in order to facilitate execution of remote processes for various offered services.

The method begins at step 405 and continues to step 410. At step 410, a firmware set is received from a software developer or user. Next, at step 415, the firmware is compared with previously received and stored firmware by the VFPs 202. The comparison reduces the number of unnecessary copies of the same firmware stored on the remote servers 104. At step 420, if the method 400 determines the firmware has already been virtualized, the method 400 ends at step 445. If however, the firmware is different or otherwise a modification of pre-existing virtualized firmware, the method 400 proceeds to step 425.

At step 425, the firmware instructions are parsed into respective variable parameters. Parsing is based on a contextual mapping of the parameters (i.e., how one parameter value is related to another parameter). The parameters are also parsed as to the context of a given parameter represents. For example, for firmware of a scanner, the parameter value of whether a signal from a certain pin represents a physical button press of a start button was received is parsed and recognized for remote processes.

Next at step 430, the method 400 determines where the values of the specific parameters originate. Parameter values may be inputted by a user, generated during operation of the user devices 102, stored in a specific memory block on the user devices, stored with a user profile for the device on the remote servers 104, or received from a remote source (e.g., CSCs 210).

At step 435, the parameters are assigned to the corresponding value sources. Assignment includes linking the parameters to network parameters in order for the firmware to listen for firmware data or routing data from a process for insertion into the firmware.

At step 440, the firmware is stored as a virtualized firmware instruction set in the virtualized firmware library 120$_N$. As described above, the library is available to the platform 108 to execute remote processes as well as ensure an updated firmware is operating on a given user device. The method 400 then ends at step 445.

In some embodiments, the virtualized firmware is called and operated in real-time execution and embedded firmware commands are integrated with remote firmware to provide real-time execution of the virtualized firmware via the user interface 211. The real-time execution may include remote process calls and decoding of commands or inquiries for services that are updated on the remote server 104a such that services developed after the user device 102n may be called in addition to those offered as when the user device 102n was developed. For example, a user may be presented with an option to assign a key on a television remote to post a TWEET of what show is currently being watched by the user. The virtualized firmware platform 108 allows the TWEET to be sent regardless of the fact that the TWITTER social service was developed after the remote control. Thus, firmware capabilities are limited to that which is offered by the virtualized firmware platform 108 and not purely the capabilities of the embedded firmware 215 on the user device 102n.

Figure 5:
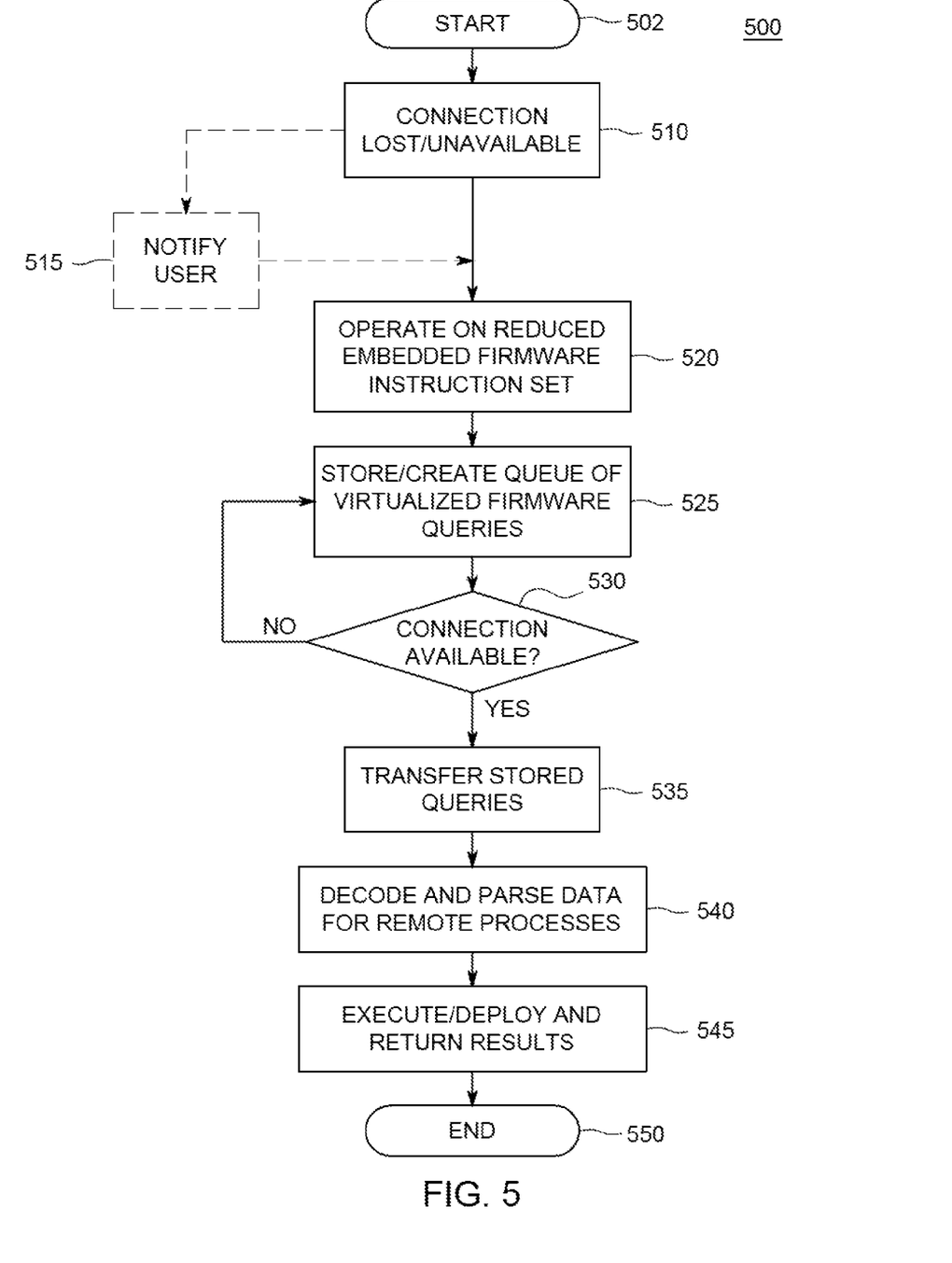
FIG. 5 is a flow diagram of a method for standalone operation of the user device using the virtualized firmware platform in accordance with one or more embodiments of the present invention.

FIG. 5 is a flow diagram of a method 500 for standalone operation of the user device 102$_N$ using the virtualized firmware platform 108 in accordance with one or more embodiments of the present invention. The method 500 is an exemplary method for handling instances wherein the user device may not have access to the virtualized firmware platform 108. The method 500 begins at step 505 and continues to step 510 wherein the connection manager 220 determines the network connection is lost or unavailable. Optionally, at step 515, the method 500 may notify the user of the dropped connection and reduced firmware capabilities. Next, at step 520, the user device 102$_N$ operates on a reduced embedded instruction set. In some embodiments, the reduced embedded instruction set is the default firmware instructions set of the user device 102$_N$. At step 520, the user device 102$_N$ the embedded firmware operates with capabilities that do not require virtualized firmware to be executed by the embedded firmware.

At step 525, the user device 102$_N$ creates and stores a queue of capabilities requiring virtualized firmware functions and queries. The method 500 continues to step 530 to determine if a connection to the remote server 104$_N$ is available returns to building the queue list at step 525 until there is a connection. If a connection is available, the method 500 continues to step 535 to transfer the stored queries to the remote server 104$_N$ to access the virtualized firmware platform 108.

Next at step 540, the transferred queries are decoded and parsed for remote processes on the remote server 104$_N$. At step 545, the method executes, deploys, and returns resultant data from remote services as described above in method 300. The method 500 then ends at step 550.

The methods disclosed herein are examples of exemplary methods of implementing the system 100 of FIG. 1 and not limiting in scope. Additional embodiments may include the method steps performed out of order or combinations of steps from various disclosed methods.

Figure 6:
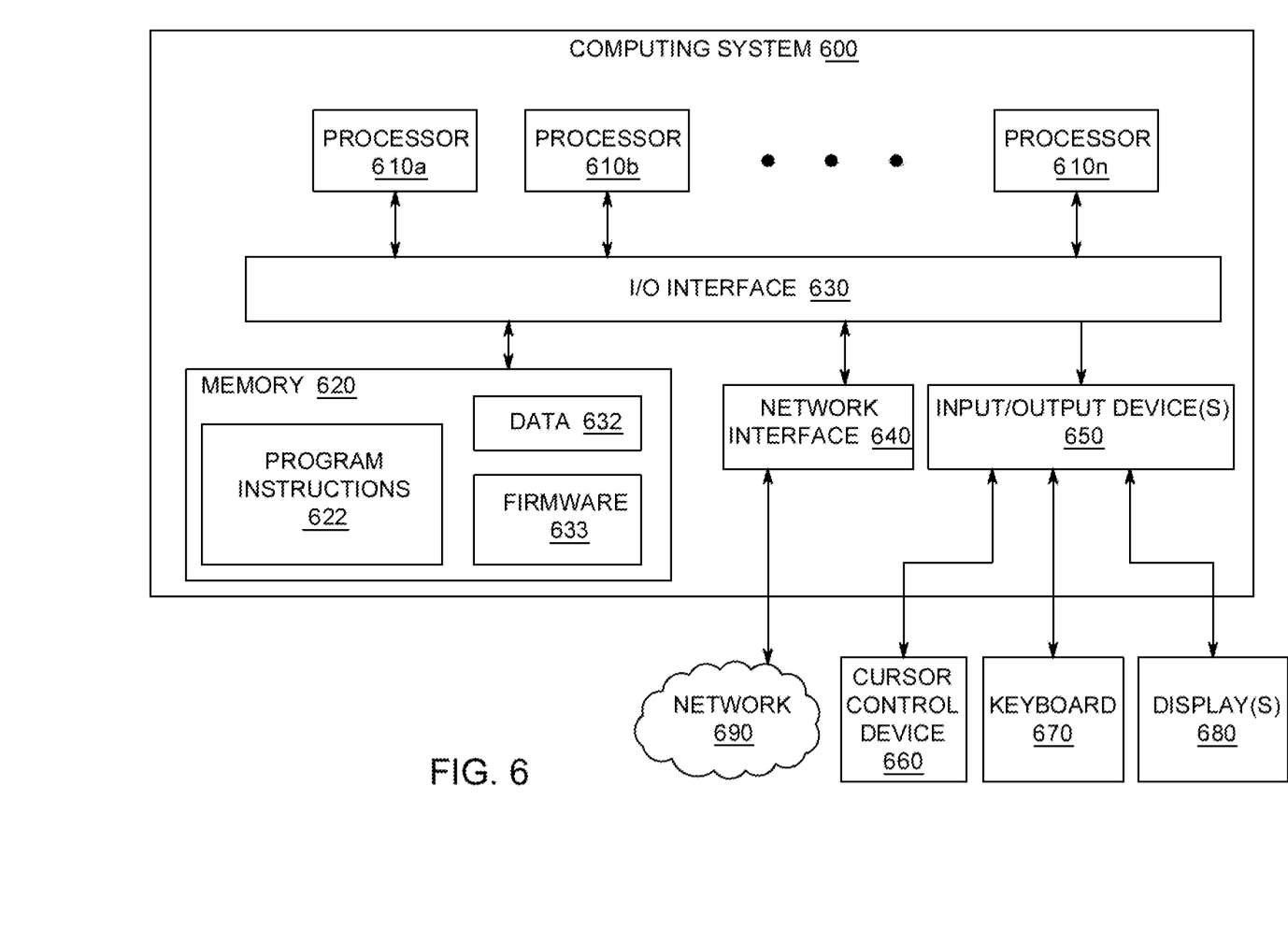
FIG. 6 is a block diagram of modules within an exemplary computing server in accordance with one or more embodiments of the present invention.

FIG. 6 is a block diagram of modules within an exemplary computing server in accordance with one or more embodiments of the present invention. The computer system 600 comprises substantially similar structure comprising servers or electronic devices in the aforementioned embodiments.

Various embodiments of methods and apparatus for virtualized firmware. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 300, 400, and 500 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 660, such as cursor control device 660, keyboard 670, and display(s) 680. In some embodiments, the keyboard 670 may be a touchscreen input device.

In various embodiments, any of the components may be utilized by the system to virtualize firmware described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). The uniprocessor system including a one processor 610 may split functionality of the single processor to appear as multiple processors for processing and executing simultaneous data of a program. Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622, firmware 633, and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, touchscreens, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIGS. 3-5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method operative to virtualize firmware of a user device comprising:
storing, on a virtualized firmware platform (VFP), a virtualized firmware for being executed on the VFP corresponding to a firmware stored in and for execution on the user device, wherein the virtualized firmware comprises parsed parameters that are linked to at least one of the user device, the VFP, or a classical services component (CSC), which is remote to the VFP and the user device;
receiving, on the VFP, firmware data from the firmware in the user device via a network, the firmware data comprising a command for deploying at least one remote process on the VFP to access a service offered by the CSC;
mapping the firmware data to the corresponding virtualized firmware;
parsing the firmware data;
inserting the firmware data into the virtualized firmware;
executing the virtualized firmware on the VFP;
deploying the at least one remote process on the VFP as a part of the execution of the virtualized firmware on the VFP; and
accessing the service offered by the CSC.

2. The method of claim 1, wherein parsing the firmware data further comprises identifying at least one parameter in the command.

3. The method of claim 2, further comprising determining a parameter value of the identified at least one parameter from the at least one of the user device, the VFP, or the CSC.

4. The method of claim 1, wherein the VFP and the CSC are virtualized by a platform on a remote server, remote to the user device.

5. The method of claim 4, wherein deploying the at least one remote process further comprises generating process code in a native language corresponding to the CSC and executing the generated process code on the CSC.

6. The method of claim 1, wherein firmware stored on the user device is different from the virtualized firmware stored on the VFP, and wherein the virtualized firmware comprises at least one of a firmware update to the firmware stored in the user device, or extended functionality for the firmware stored in the user device.

7. The method of claim 1, further comprising retrieving user data stored on the VFP corresponding to the user device for inserting into the virtualized firmware, and inserting the retrieved user data into the virtualized firmware.

8. A method to access from a user device, a firmware virtualization system on a remote server comprising:
connecting over a network, from the user device to a remote virtualized firmware platform (VFP) on the remote server using a connection manager on the user device;
sending a firmware data from a firmware stored on the user device to a virtualized firmware on the VFP for deployment of a remote process on the VFP to access a remote service on a classical services component (CSC), based on the firmware data, wherein the VFP maps the firmware data to the corresponding virtualized firmware;
parses the firmware data;
inserts the firmware data into the virtualized firmware;
executes the virtualized firmware on the VFP;
receiving a processed data from the remote process executed by the VFP to access the remote service on the CSC, wherein the processed data is in a native language of the firmware stored on the user device; and
operating the user device and the stored firmware based on the processed data, wherein the CSC is remote to the VFP and the user device.

9. The method of claim 8, wherein the connecting further comprises authenticating the user device with a corresponding user account on the remote server.

10. The method of claim 8, wherein the firmware on the user device comprises a remote process call to initiate the deployment of the remote process on the VFP to access a remote service on the CSC.

11. A system operative to virtualize firmware of a user device comprising:
a) at least one processor;
b) at least one input device coupled to at least one network; and
c) at least one storage device storing processor executable instructions which, when executed by the at least one processor, performs a method including:
storing, on a virtualized firmware platform (VFP), a virtualized firmware for being executed on the VFP corresponding to a firmware stored in and for execution on the user device, wherein the virtualized firmware comprises parsed parameters that are linked to at least one of the user device, the VFP, or a classical services component (CSC), which is remote to the VFP and the user device,
receiving, on the VFP, firmware data from the firmware in the user device via a network, the firmware data comprising a command for deploying at least one remote process on the VFP to access a remote service offered by the CSC,
mapping the firmware data to the corresponding virtualized firmware,
parsing the firmware data,
inserting the firmware data into the virtualized firmware,
executing the virtualized firmware on the VFP,
deploying the at least one remote process on the VFP as a part of the execution of the virtualized firmware on the VFP, and
accessing the service offered by the CSC.

12. The system of claim 11, wherein parsing the firmware data further comprises identifying at least one parameter in the command.

13. The system of claim 12, wherein the method further comprises determining a parameter value of the identified at least one parameter from the at least one of the user device, the VFP, or the CSC.

14. The system of claim 11, wherein the VFP and the CSC are virtualized by a platform on a remote server, remote to the user device.

15. The system of claim 14, wherein deploying the at least one remote process further comprises generating process code in a native language corresponding to the CSC and executing the generated process code on the CSC.

16. The system of claim 11, wherein the method further comprises retrieving user data stored on the VFP corresponding to the user device for inserting into the virtualized firmware, and inserting the retrieved user data into the virtualized firmware.

17. The method of claim 1, wherein the firmware on the user device comprises a remote process call to deploy a remote process on the VFP to access a remote service on the CSC.

18. The system of claim 11, wherein the firmware on the user device comprises a remote process call to deploy a remote process on the VFP to access a remote service on the CSC.

19. The method of claim 1, further comprising:
receiving, at the VFP, resultant data from the service offered by the CSC;
converting the resultant data to native language of the firmware being executed on the user device if the resultant data is not already in the native language; and
sending, from the VFP, the resultant data to the firmware on user device.

20. The method of claim 1, wherein the virtualized firmware is executed on the VFP in collaboration with the firmware being executed on the user device.

* * * * *